(12) United States Patent
Chhabra et al.

(10) Patent No.: US 11,513,669 B2
(45) Date of Patent: Nov. 29, 2022

(54) USER INTERFACE FOR MODIFYING PICTURES

(71) Applicant: Micron Technology, Inc., Boise, ID (US)

(72) Inventors: Bhumika Chhabra, Boise, ID (US); Carla L. Christensen, Boise, ID (US)

(73) Assignee: Micron Technology, Inc., Boise, ID (US)

(*) Notice: Subject to any disclaimer, the term of this patent is extended or adjusted under 35 U.S.C. 154(b) by 265 days.

(21) Appl. No.: 16/805,199

(22) Filed: Feb. 28, 2020

(65) Prior Publication Data

US 2021/0271379 A1 Sep. 2, 2021

(51) Int. Cl.
| | |
|---|---|
| *G06F 3/04845* | (2022.01) |
| *G06F 3/0482* | (2013.01) |
| *G06F 3/04817* | (2022.01) |
| *H04N 5/265* | (2006.01) |
| *H04N 5/272* | (2006.01) |
| *G06T 7/13* | (2017.01) |
| *G06T 7/174* | (2017.01) |

(Continued)

(52) U.S. Cl.
CPC ........ *G06F 3/04845* (2013.01); *G06F 3/0482* (2013.01); *G06F 3/04817* (2013.01); *G06T 7/13* (2017.01); *H04N 5/232933* (2018.08); *H04N 5/265* (2013.01); *H04N 5/272* (2013.01); *G06T 7/174* (2017.01); *G06T 7/194* (2017.01); *G06T 2200/24* (2013.01)

(58) Field of Classification Search
CPC .......... G06T 7/13; G06T 7/174; G06T 7/194; G06T 2200/24; G06F 3/04845; G06F 3/04817; G06F 3/0482; H04N 6/272; H04N 6/265; H04N 6/232933
See application file for complete search history.

(56) References Cited

U.S. PATENT DOCUMENTS

| | | | |
|---|---|---|---|
| 9,519,999 B1* | 12/2016 | Gharpure | ................. G06T 7/00 |
| 9,754,164 B2 | 9/2017 | Macciola et al. | |
| 9,930,269 B2 | 3/2018 | Kim | |
| 9,996,741 B2 | 6/2018 | Amtrup et al. | |

(Continued)

OTHER PUBLICATIONS

International Search Report and Written Opinion from related international application No. PCT/US2021/017461, dated Jun. 1, 2021, 10 pages.

*Primary Examiner* — Daniel Samwel
(74) *Attorney, Agent, or Firm* — Brooks, Cameron & Huebsch, PLLC

(57) ABSTRACT

Methods, devices, and systems related to a user interface for modifying pictures are described. Modifying pictures can include placing an image of a picture in a different picture, replacing an image of the picture with a different image, deleting an image from the picture, and/or storing an image from the picture. In an example, a method can include displaying a first picture on a user interface of a mobile device, receiving, on the user interface, a selection of at least one foreground image included in the first picture, receiving, on the user interface, a selection of a background image included in a library of images, and displaying, on a user interface, a second picture including the at least one selected foreground image and the selected background image responsive to receiving the selection of the at least one foreground image followed by the selection of the background image.

20 Claims, 3 Drawing Sheets

(51) Int. Cl.
*G06T 7/194* (2017.01)
*H04N 5/232* (2006.01)

(56) References Cited

U.S. PATENT DOCUMENTS

| | | | |
|---|---|---|---|
| 10,318,794 B2 | 6/2019 | Lee et al. | |
| 2002/0030634 A1 | 3/2002 | Noda et al. | |
| 2003/0063800 A1* | 4/2003 | Ma | G06T 11/203 |
| | | | 382/173 |
| 2003/0156759 A1* | 8/2003 | Colmenarez | G06T 7/143 |
| | | | 382/228 |
| 2004/0062439 A1* | 4/2004 | Cahill | H04N 5/272 |
| | | | 382/173 |
| 2009/0044136 A1* | 2/2009 | Flider | G06F 16/4393 |
| | | | 715/764 |
| 2012/0046080 A1* | 2/2012 | Koh | H04B 1/3888 |
| | | | 455/566 |
| 2013/0089258 A1* | 4/2013 | Herling | G06K 9/00771 |
| | | | 382/173 |
| 2014/0071045 A1* | 3/2014 | Muchnick | G06F 3/04845 |
| | | | 345/156 |
| 2014/0168470 A1* | 6/2014 | Yoshino | H04N 5/232945 |
| | | | 348/231.7 |
| 2014/0169667 A1* | 6/2014 | Xiong | G06K 9/4609 |
| | | | 382/164 |
| 2014/0184858 A1 | 7/2014 | Yu | |
| 2014/0359525 A1* | 12/2014 | Weiner | G06F 3/0485 |
| | | | 715/782 |
| 2015/0227782 A1* | 8/2015 | Salvador | G06F 16/5854 |
| | | | 382/118 |
| 2016/0148428 A1 | 5/2016 | Agarwal | |
| 2016/0225127 A1 | 8/2016 | Lu | |
| 2017/0070670 A1 | 3/2017 | Kwon | |
| 2017/0192651 A1* | 7/2017 | Yang | H04L 67/306 |
| 2019/0080457 A1 | 3/2019 | Shukla | |
| 2019/0278844 A1* | 9/2019 | Brixey | G06F 3/04842 |
| 2020/0112694 A1* | 4/2020 | Hirabayashi | H04N 5/2625 |
| 2020/0380697 A1* | 12/2020 | Nakagawa | G03B 15/00 |
| 2021/0042950 A1* | 2/2021 | Wantland | G06T 19/006 |

* cited by examiner

USER INTERFACE FOR MODIFYING PICTURES

TECHNICAL FIELD

The present disclosure relates generally to a mobile device, and more particularly, to methods, apparatuses, and systems related to a user interface of a mobile device for modifying pictures.

BACKGROUND

A mobile device can be, for example, a smart phone, a tablet, a wrist-worn device, a digital camera, and/or redundant combinations thereof, among other types of mobile devices. Mobile devices can include one or more cameras to capture pictures. In some examples, a picture can contain an unwanted person, animal, object, and/or background.

A mobile device can also include a number of applications. An application can be included or downloaded onto a mobile device to modify pictures. Picture modification applications can include manually drawing and cropping around a wanted and/or unwanted background, person, animal, and/or object.

DETAILED DESCRIPTION

Figure 1:
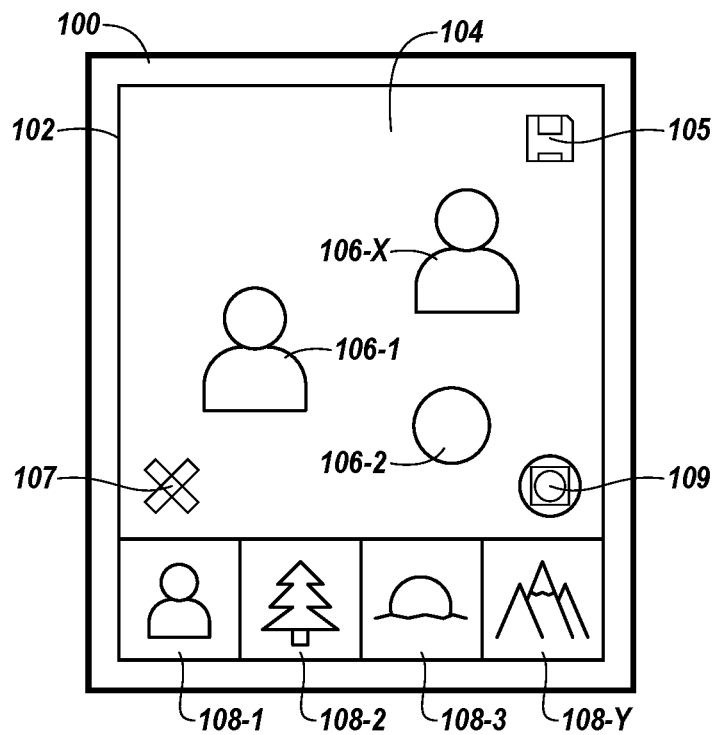
FIG. 1 illustrates an example of a user interface of a mobile device for picture modification in accordance with a number of embodiments of the present disclosure.

The present disclosure includes methods, apparatuses, and systems related to a user interface for modifying pictures. An example method includes displaying a first picture on a user interface of a mobile device, receiving, on the user interface, a selection of at least one foreground image included in the first picture, receiving, on the user interface, a selection of a background image included in a library of images, and displaying, on a user interface, a second picture including the at least one selected foreground image and the selected background image responsive to receiving the selection of the at least one foreground image followed by the selection of the background image.

In some examples, a foreground image can be an object, an animal, or a person. When a user selects a foreground image, the foreground image can be outlined to indicate that the foreground image was selected. Once the foreground image is selected, a user can place the foreground image in a different picture, replace the foreground image with a different foreground image, delete the foreground image from the picture, and/or store the foreground image in a library of images.

A background image can be an area and/or scenery in a picture. When a user selects a background image, the background image can be outlined to indicate that the background image was selected. Once the background image is selected, a user can place the background image in a different picture, replace the background image with a different background image, delete the background image from the picture, and/or store the background image in a library of images.

In a number of embodiments, the foreground and/or background images (e.g., images) can be identified and/or classified as familiar or unfamiliar. Artificial intelligence (AI) operations can be used to identify and/or classify the images. Data stored in memory on and/or external to the mobile device can be used in performing the AI operations. For example, pictures stored in memory, viewed by the user on social media, and/or viewed by the user on the Internet can be analyzed to identify familiar images. These familiar images can be compared to an image included in a picture on the user interface. An image on the user interface can be identified as familiar responsive to the image on the user interface matching a familiar image and the image on the user interface can be identified as unfamiliar responsive to not matching a familiar image. In some examples, images can be outlined and/or removed from the picture by the mobile device if classified as unfamiliar.

As used herein, "a number of" something can refer to one or more of such things. For example, a number of memory devices can refer to one or more memory devices. A "plurality" of something intends two or more. Additionally, designators such as "X" and "Y", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. In some instances, a plurality of similar, but functionally and/or structurally distinguishable, elements or components in the same figure or in different figures may be referenced sequentially with the same element number (e.g., 108-1, 108-2, 108-3, and 108-Y in FIG. 1). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a user interface 100 of a mobile device (e.g., mobile device 550 in FIG. 5) for picture modification in accordance with a number of embodiments of the present disclosure. The user interface 100, as illustrated in FIG. 1, can further include a picture 102, a plurality of library images 108-1, 108-2, 108-3, . . . , 108-Y, a save icon 105, a delete icon 107, and a capture icon 109.

The picture 102 can include a background image 104 and a plurality of foreground images 106-1, 106-2, and 106-X. As used herein, a background image can be an area and/or scenery in a picture and a foreground image can be any object, animal, and/or person in a picture. The picture 102 and the plurality of library images 108-1, . . . , 108-Y can be captured by a camera (e.g., camera 554 in FIG. 5), retrieved from memory (e.g., memory 552 in FIG. 5) on and/or external to the mobile device, retrieved from social media, and/or retrieved from the Internet. The plurality of library images 108-1, . . . , 108-Y can include background images and/or foreground images. For example, library images 108-1 and 108-2 are foreground images of a person and a tree, respectively and library images 108-3 and 108-Y are background images of a sunset over water and a mountain range, respectively.

The user interface 100 can be generated by a computing device, for example, a mobile device. The user interface 100 can be a graphical user interface (GUI) that can provide and/or receive information to and/or from the user of the mobile device. The user interface 100 can be shown on a display (e.g., display 553 in FIG. 5) of the mobile device. In some examples, the display can be a touch-screen.

In a number of embodiments, the user interface 100 can be generated in response to an input from a user (e.g., a person). A user input to generate the user interface 100 can include opening a picture modification application installed on and/or using the mobile device, opening a camera application installed on and/or using the mobile device, and/or capturing a picture using the mobile device.

Once the user interface 100 is generated on the mobile device, the user interface 100 can modify pictures in response to a user's selections (e.g., pressing, tapping, and/or clicking) on the user interface 100. For example, a user can delete foreground image 106-1 from picture 102 by selecting the foreground image 106-1 followed by selecting the delete icon 107. After modifying the picture 102, the new picture including picture 102 without image 106-1 can be captured by the camera responsive to selecting the capture icon 109 and/or stored in memory responsive to selecting the save icon 105.

Artificial intelligence (AI) operations can be used to identify the background image 104 and the plurality of foreground images 106-1, 106-2, and 106-X. Pictures stored in memory, on social media, and/or on the Internet can include a number of known images. These known images can be used to identify images within picture 102 by comparing characteristics (e.g., shape, size, color, etc.) of the known images with characteristics included in picture 102. Identifying an image in the picture 102 can include determining a boundary (e.g., perimeter) of the image in the picture 102. Once a boundary of the image is determined, the user interface 100 can receive a selection of the image responsive to a user selecting within the boundary of the image and/or within a particular distance of the boundary of the image.

Figure 2:
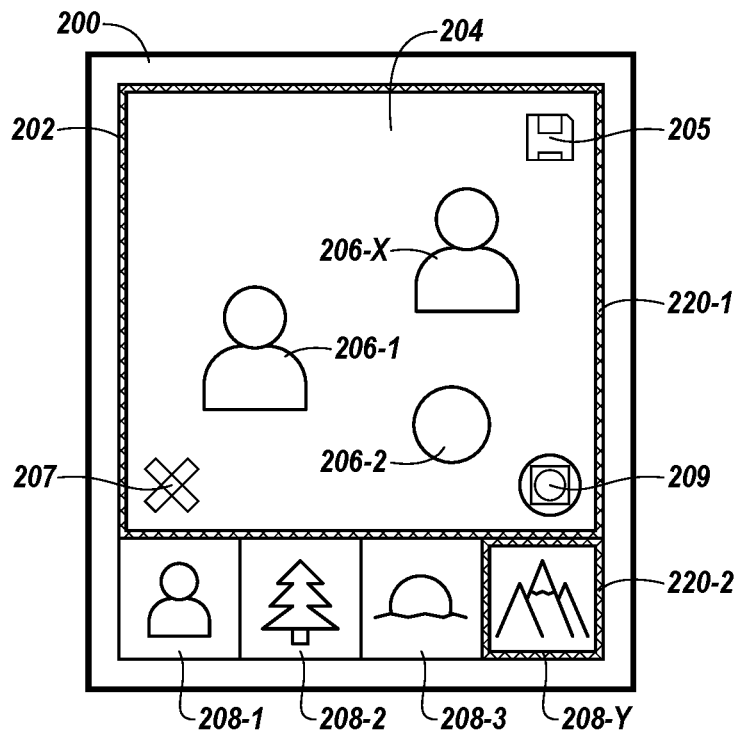
FIG. 2 illustrates an example of a user interface of a mobile device for picture modification including a plurality of outlines in accordance with a number of embodiments of the present disclosure.

FIG. 2 illustrates an example of a user interface 200 of a mobile device (e.g., mobile device 550 in FIG. 5) for picture modification including a number of outlines 220-1, 220-2 in accordance with a number of embodiments of the present disclosure. The user interface 200, as illustrated in FIG. 2, can further include a picture 202, a plurality of library images 208-1, 208-2, 208-3, . . . , 208-Y, a save icon 205, a delete icon 207, and a capture icon 209. The picture 202 can include a background image 204 and a plurality of foreground images 206-1, 206-2, and 206-X.

In some examples, the user interface 200 can include one or more outlines 220-1, 220-2. The outlines 220-1, 220-2 can indicate a selection of a background image, a foreground image, and/or a library image. Embodiments of the present disclosure, however, are not limited to an outline to indicate a selection. Other indications of a selection can be used, for example, a background image, a foreground image, and/or a library image can be colored differently and/or highlighted responsive to a selection.

As shown in FIG. 2, the user interface 200 includes outline 220-1 around a perimeter of background image 204. The user interface 200 includes outline 220-1 responsive to the user interface 200 receiving a selection of the background image 204. In FIG. 2, the user interface 200 also includes outline 220-2. Outline 220-2 is around a perimeter of library image 208-Y. The user interface 200 includes outline 220-2 responsive to the user interface 200 receiving a selection of library image 208-Y.

A background image or a foreground image of a picture can be replaced by a library image responsive to a user selecting a background image or a foreground image followed by a selection of a library image. For example, background image 204 can be replaced by library image 208-Y responsive to a user selecting the background image 204 of the picture 202 followed by a selection of the library image 208-Y. The replacement of background image 204 with library image 208-Y is illustrated in FIG. 3.

Figure 3:
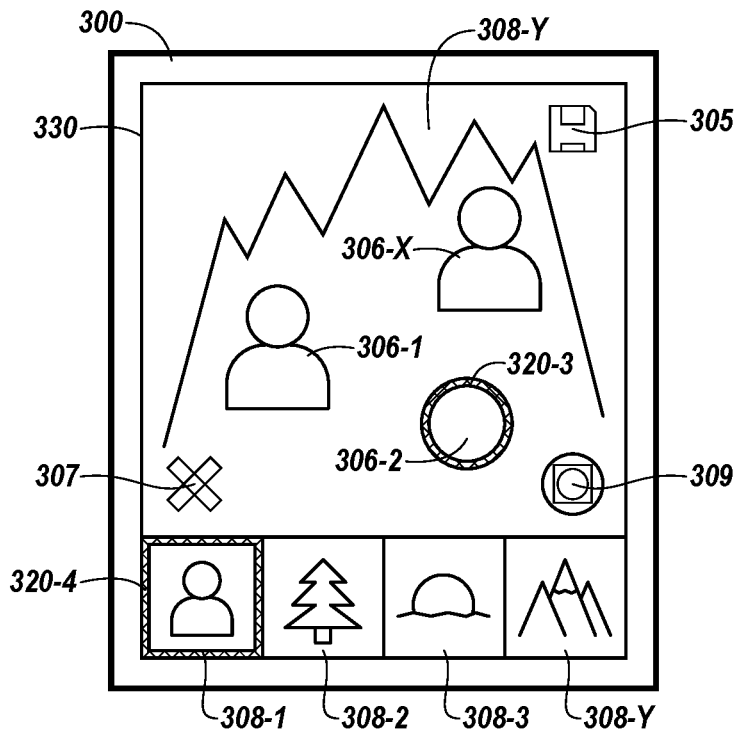
FIG. 3 illustrates an example of a user interface of a mobile device for picture modification including a plurality of outlines in accordance with a number of embodiments of the present disclosure.

FIG. 3 illustrates an example of a user interface 300 of a mobile device (e.g., mobile device 550 in FIG. 5) for picture modification including a number of outlines 320-3, 320-4 in accordance with a number of embodiments of the present disclosure. The user interface 300, as illustrated in FIG. 3, can further include a picture 330, a plurality of library images 308-1, 308-2, 308-3, . . . , 308-Y, a save icon 305, a delete icon 307, and a capture icon 309. The picture 330 can include a background image 308-Y and a plurality of foreground images 306-1, 306-2, and 306-X.

In some examples, the user interface 300 can include one or more outlines 320-3, 320-4. The outlines 320-3, 320-4 can indicate a selection of a background image, a foreground image, and/or a library image. As shown in FIG. 3, the user interface 300 includes outline 320-3 around a perimeter of foreground image 306-2. The user interface 300 includes outline 320-3 responsive to the user interface 300 receiving a selection of the foreground image 306-2.

In FIG. 3, the user interface 300 also includes outline 320-4. Outline 320-4 is around a perimeter of library image 308-1. The user interface 300 includes outline 320-4 responsive to the user interface 300 receiving a selection of the library image 308-1. As previously described in FIG. 2, a background image or a foreground image of a picture can be replaced by a library image responsive to a user selecting a background image or a foreground image followed by a selection of a library image. For example, foreground image 306-2 can be replaced by library image 308-1 responsive to a user selecting the foreground image 306-2 of the picture 330 followed by a selection of the library image 308-1. The replacement of foreground image 306-2 with library image 308-1 is illustrated in FIG. 4.

Figure 4:
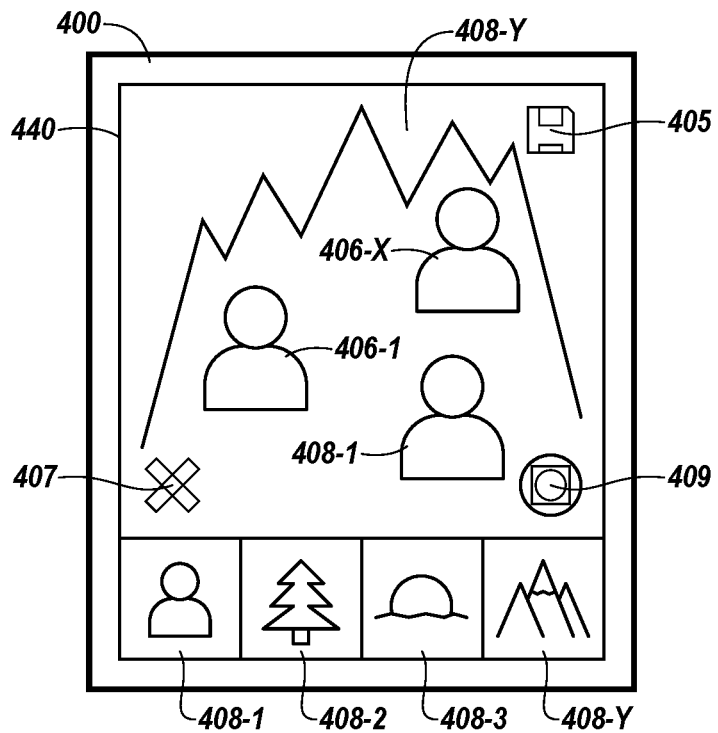
FIG. 4 illustrates an example of a user interface of a mobile device for picture modification in accordance with a number of embodiments of the present disclosure.

FIG. 4 illustrates an example of a user interface 400 of a mobile device (e.g., mobile device 550 in FIG. 5) for picture modification in accordance with a number of embodiments of the present disclosure. The user interface 400, as illustrated in FIG. 4, can further include a picture 440 including a background image 408-Y and a plurality of foreground images 408-1, 406-1, and 406-X, a plurality of library images 408-1, 408-2, 408-3, and 408-Y, a save icon 405, a delete icon 407, and a capture icon 409.

Once the user is done modifying the picture 440, the user can capture the picture 440 by selecting the capture icon 409. For example, one or more foreground images and/or a background image can be being generated by a camera and displayed in real time on the user interface 400. The user interface 400 can receive the selection of the capture icon 409 and capture the one or more images being displayed in real time. For example, the foreground images 406-1 and 406-X can be being displayed in real time while the foreground image 408-1 and the background image 408-Y can be previously captured images. The foreground images 406-1 and 406-X displayed in real time can be captured responsive to the user selecting the capture icon 409.

Once the user is done modifying the picture 440 and has captured the one or more foreground images 408-1, 406-1, and 406-X and the background image 408-Y, the user can store the picture 440 in memory. The user can store the picture 440 in memory responsive to selecting the save icon 405. The picture 440 can be stored in memory on the mobile device and/or external to the mobile device.

Figure 5:
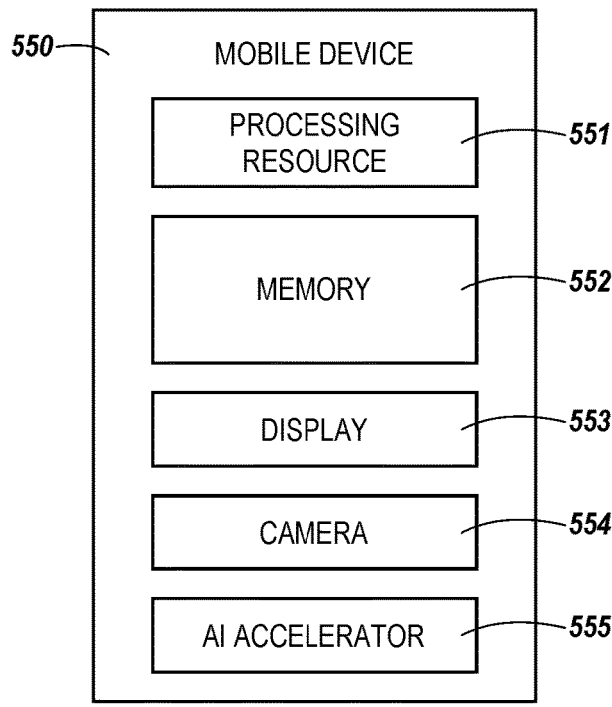
FIG. 5 illustrates an example of a mobile device used for picture modification in accordance with a number of embodiments of the present disclosure.

FIG. 5 illustrates an example of a mobile device 550 used for picture modification in accordance with an embodiment of the present disclosure. As illustrated in FIG. 5, mobile device 550 can include a processing resource (e.g., processor) 551, a memory 552, a display 553, a camera 554, and an artificial intelligence (AI) accelerator 555. The mobile device 550 can be, for example, a smart phone, a tablet, a wrist-worn device, and/or redundant combinations thereof, among other types of mobile devices.

The memory 552 can be any type of storage medium that can be accessed by the processing resource 551 to perform various examples of the present disclosure. For example, the memory 552 can be a non-transitory computer readable medium having computer readable instructions (e.g., computer program instructions) stored thereon that are executable by the processing resource 551 to generate a user interface in accordance with the present disclosure.

The memory 552 can be volatile or nonvolatile memory. The memory 552 can also be removable (e.g., portable) memory, or non-removable (e.g., internal) memory. For example, the memory 552 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 552 is illustrated as being located within mobile device 550, embodiments of the present disclosure are not so limited. For example, memory 552 can be located on an external computing resource (e.g., enabling computer readable instructions to be downloaded over the Internet or another wired or wireless connection).

As illustrated in FIG. 5, mobile device 550 includes a display 553. A user (e.g., operator) of mobile device 550, can interact with mobile device 550 via a user interface shown on display 553. For example, the user interface via display 553 can provide (e.g., display and/or present) information to the user of mobile device 550, and/or receive information from (e.g., input by) the user of mobile device 550. For instance, in some embodiments, the user interface can be a graphical user interface (GUI) that can provide and/or receive information to and/or from the user of mobile device 550. The display 553 can be, for instance, a touch-screen (e.g., the GUI can include touch-screen capabilities).

The mobile device 550 can include one or more cameras 554. The one or more cameras 554 can be used to capture videos, an entire picture, and/or a particular foreground or background image of the picture. For example, a first camera of the one or more cameras 554 can capture foreground images and a second camera of the one or more cameras 554 can capture background images.

The AI accelerator 555 can include hardware and/or software/firmware, not shown, to perform AI operations. Data stored in memory 552 on the mobile device 550 and/or external to the mobile device 550 can be used in performing the AI operations. For example, pictures from the mobile device 550, social media, and/or the Internet can be used to perform AI operations.

In a number of embodiments, the AI accelerator 554 can be used to perform AI operations to identify and/or classify foreground, background, and/or library images (e.g., images). Pictures stored in memory 552, on social media, and/or on the Internet can include a number of known images. These known images can be used to identify images and their boundaries within a picture by comparing characteristics (e.g., shape, size, color, etc.) of the known images with characteristics included in the picture. Once a boundary of the image is determined, the user interface can receive a selection of the image and perform image modification operations on the image. Image modification operations can include sizing, cropping, adjusting a picture angle, rotating, flipping, lightening, darkening, and/or saturating one or more images, among other operations.

In some examples, the images can be classified as familiar or unfamiliar. Pictures stored in memory 552, viewed by the user on social media, and/or viewed by the user on the Internet can be analyzed to identify familiar images. Familiar images can be images that are stored in memory, have been stored in memory a threshold number of times, have been viewed by the user, and/or have been viewed by the user a threshold number of times. These familiar images can be compared to an image included in a picture on the user interface by comparing characteristics (e.g., shape, size, color, etc.) of the familiar image with characteristics of the image included in the picture. An image on the user interface can be identified as familiar responsive to the image on the user interface including a threshold number of characteristics of a familiar image and the image on the user interface can be identified as unfamiliar responsive to not including the threshold number of characteristics of the familiar image.

In some examples, images can be outlined. An image can be outlined by the mobile device 550 to notify the user that the image is unfamiliar. The user can then choose to remove the unfamiliar image or keep the unfamiliar image. If the user chooses to keep the image, in some examples, the image can be reclassified as a familiar image by the mobile device 550.

In a number of embodiments, an image can be removed from the picture by the mobile device 550 if classified as unfamiliar or the image can be manually removed by the user selecting the image followed by selecting the delete icon. Removing, deleting, or replacing a foreground image can leave an area of a picture, where the foreground image was, void of a portion of the background image.

The void can be replaced (e.g., filled in) by finding different pictures including the background image with the missing portion. Pictures on the mobile device 550, social media, and/or the Internet can be used to perform AI operations to find different pictures including the background image by finding pictures including a threshold number of the same characteristics as the background image. When a different picture with the background image is found, the missing portion can be identified by comparing characteristics of the background image around the perimeter of the void with characteristics of the background image in the different picture. Once the missing portion of the background image is identified, the missing portion can be copied and used to replace the void.

Replacing the void can include a number of picture modification operations to match the missing portion with the rest of the background image. For example, the missing portion and/or the background image of the picture can be sized, lightened, darkened, saturated, among other operations to tie the missing portion and the rest of the picture together.

The AI accelerator 554, in some examples, can use location data to identify and/or classify images. Metadata of an image can include a location, for example coordinates, where the image was captured. Images captured at and/or within a particular distance of a particular location can be classified as familiar. For example, when the location of the mobile device 550 is at or within a particular distance of a known attraction (e.g., well known person and/or place), the AI accelerator 554 can keep the known attraction in the picture and remove other unfamiliar images.

Images captured within a particular distance of a particular location and/or images captured a particular distance away from a particular location can include different picture modification protocols (e.g., edit, replace, delete, and/or save particular images) for the AI accelerator 554. Picture modification protocols for the AI accelerator 554 can also be changed by a user by selecting different modes. For example, a user could select a vacation mode to change picture modification protocols for the AI accelerator 554.

Figure 6:
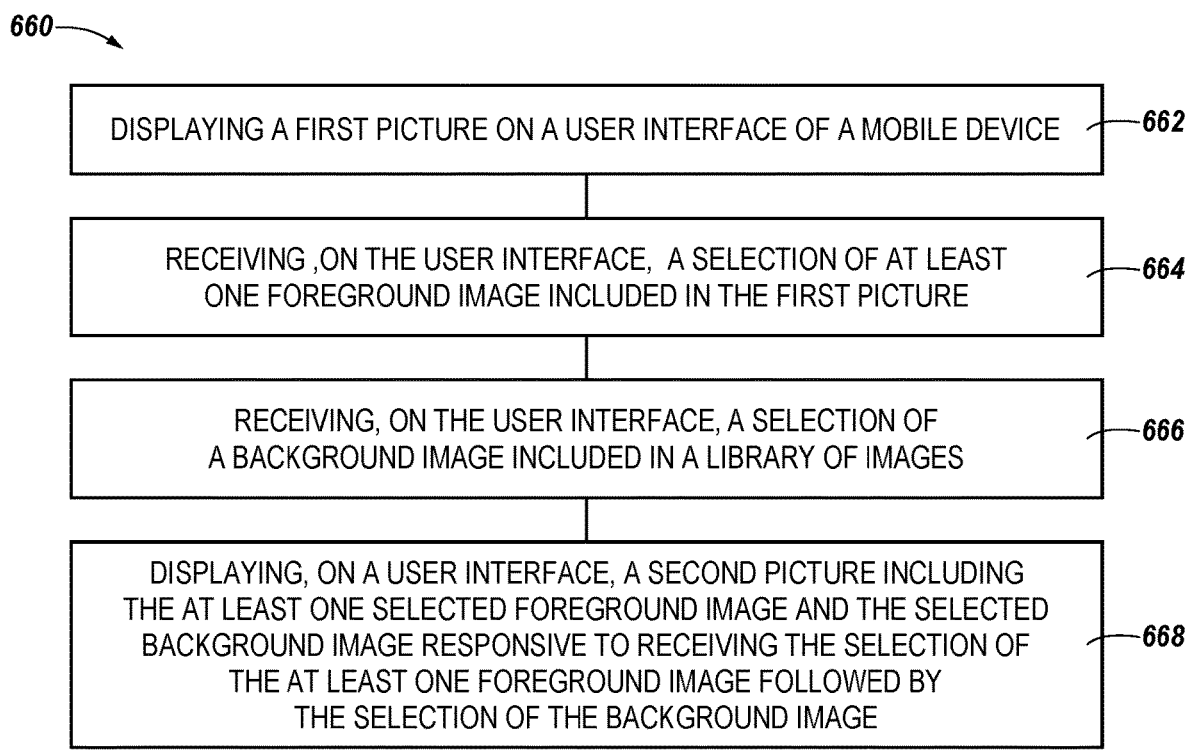
FIG. 6 is a flow diagram of a method for picture modification in accordance with a number of embodiments of the present disclosure.

FIG. 6 is a flow diagram of a method 660 for picture modification in accordance with a number of embodiments of the present disclosure. At block 662, the method 660 can include displaying a first picture on a user interface of a mobile device. The user interface can be a graphical user interface (GUI) that can provide and/or receive information to and/or from a user of the mobile device. The user interface can be shown on a display, for example, a touch-screen.

At block 664, the method 660 can include receiving, on the user interface, a selection of at least one foreground image included in the first picture. A foreground image can be an object, an animal, or a person. When a user selects a foreground image, the foreground image can be outlined to indicate that the foreground image was selected. Once the foreground image is selected a user can place the foreground image on a different background image, replace the foreground image with a different foreground image, delete the foreground image from the picture, and/or save the foreground image.

At block 666, the method 660 can include receiving, on the user interface, a selection of a background image included in a library of images. A background image can be an area and/or scenery in a picture. When a user selects a background image, the background image can be outlined to indicate that the background image was selected. Once the background image is selected a user can place the background image in a different picture, replace the background image with a different background image, delete the background image from the picture, and/or save the background image.

At block 668, the method 660 can include displaying, on a user interface, a second picture including the at least one selected foreground image and the selected background image responsive to receiving the selection of the at least one foreground image followed by the selection of the background image. A selection of the at least one foreground image can occur responsive to a user selecting and/or selecting within a particular distance of the at least one foreground image on a display. A selection of the background image can occur responsive to the user selecting and/or selecting within a particular distance of the background image on the display.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    displaying a first picture on a user interface of a mobile device;
    identifying a boundary of at least one foreground image included in the first picture as familiar by comparing characteristics of a number of familiar images with characteristics included in the first picture, wherein a user of the mobile device viewed the number of familiar images from at least one of a memory on the mobile device, social media, or the Internet;
    receiving, on the user interface, a selection within the identified boundary of the at least one foreground image included in the first picture;
    receiving, on the user interface, a selection of a background image included in a library of images; and
    displaying, on the user interface, a second picture including the at least one selected foreground image and the background image responsive to receiving the selection within the identified boundary of the at least one foreground image followed by the selection of the background image.

2. The method of claim 1, further comprising:
    storing the second picture in the memory on the mobile device responsive to receiving a selection of a save icon while the second picture is being displayed on the user interface.

3. The method of claim 1, further comprising:
    displaying the first picture with the at least one selected foreground image outlined on the user interface responsive to receiving the selection within the identified boundary of the at least one foreground image.

4. The method of claim 1, further comprising:
identifying a boundary of the at least one foreground image responsive to performing an artificial intelligence (AI) operation.

5. The method of claim 1, further comprising:
identifying a boundary of the background image responsive to performing an aritificial intelligence (AI) operation.

6. The method of claim 1, further comprising:
displaying a third picture on the user interface;
receiving, on the user interface, a selection of the background image included in the thirs picture, and
storing the background image in the library of images responsive to receiving the selection of the background image followed by a selection of a save icon on the user interface.

7. The method of claim 1, further comprising:
displaying at least one image from the library of images on the user interface while displaying the first picture on the user interface.

8. An apparatus, comprising:
a user interface;
a memory; and
a processor configured to execute executable instructions stored in the memory to:
display a first picture on a user interface of a mobile device;
identify a boundary of at least one foreground image included in the first picture as familiar by comparing characterisitics of a number of familiar images with characterisitics included in the first picture, wherein a user of the mobile device viewed the number of familiar images from at least one of the memory, social media, or the Internet;
receive, on the user interface, a selection within the identified boundary of the at least one foreground image of one or more foreground images included in the first picture;
receive, on the user interface, a selection of delete icon; and
display a second picture on the user interface of the mobile device responsive to receiving the selection within the identified boundary of the at least one foreground image followed by the selection of the delete icon, wherein the second picture is the first picture without the at least one selected foreground image.

9. The apparatus of claim 8, the processor further configured to execute instructions stored in the memory to:
classify the one or more foreground images as familiar responsive to displaying the first picture on the user interface.

10. The apparatus of claim 9, the processor further configured to execute instructions stored in the memory:
outline the one or more foreground images classified as unfamiliar in the first picture responsive to classifying the one or more foreground images.

11. The apparatus of claim 9, the processor further configured to execute instructions stored in the memory to:
perform artificial intelligence (AI) operations to classify the one or more foreground images as familiar or unfamiliar.

12. The apparatus of claim 11, the processor further configured to execute instructions stored in the memory to:
perform the AI operations to classify the one or more foreground images as familiar or unfamiliar using image data stored in the memory.

13. The apparatus of claim 12, wherein the image data includes previously captured pictures.

14. A system, comprising,
a user interface;
a memory; and
a processor configured to execute executable instructions stored in the memory to:
display a first picture on the user interface;
identify a boundary of a first foreground image included in the first picture as familiar by comparing characteristics of a number of familiar images with characterisitics included in the first picture, wherein a user of the system viewed the number of familiar images from at least one of the memory, social media, or the Internet;
receive, on the user interface, a selection within the identified boundary of the first foreground image included in the first picture;
receive, on the user interface, a selection of a second picture;
display the second picture in place of the first picture on the user interface responsive to receiving the selection of the second picture;
receive, on the user interface, a selection of a second foreground image included in the second picture; and
display a third picture on the user interface responsive to receiving the selection within the identified boundary of the first foreground image followed by the selection of the second foreground image, wherein the third picture is the first picture with the first foreground image replaced by the second foreground image.

15. The system of claim 14, further comprising:
a camera, wherein the first picture is captured by the camera.

16. The system of claim 14, wherein the first foreground image is an object, an animal, or a person.

17. The system claim 14, wherein the second foreground image is an object, an animal, or a person.

18. The system of claim 14, wherein the processor is further configured to execute the executable instructions stored in the memory to:
capture the second picture responsive to receiving on the user interface a selection of a capture icon while displaying the second picture.

19. The system of claim 14, wherein the processor is further configured to execute the executable instructions stored in the memory to:
capture the second picture responsive to receiving on the user interface a selection of a capture icon while displaying the second picture.

20. The system of claim 14, wherein the processor is further configured to execute the executable instructions stored in the memory to:
store the third picture in the memory responsive to receiving a selection of a save icon while displaying the third picture.

* * * * *